United States Patent Office 2,907,673
Patented Oct. 6, 1959

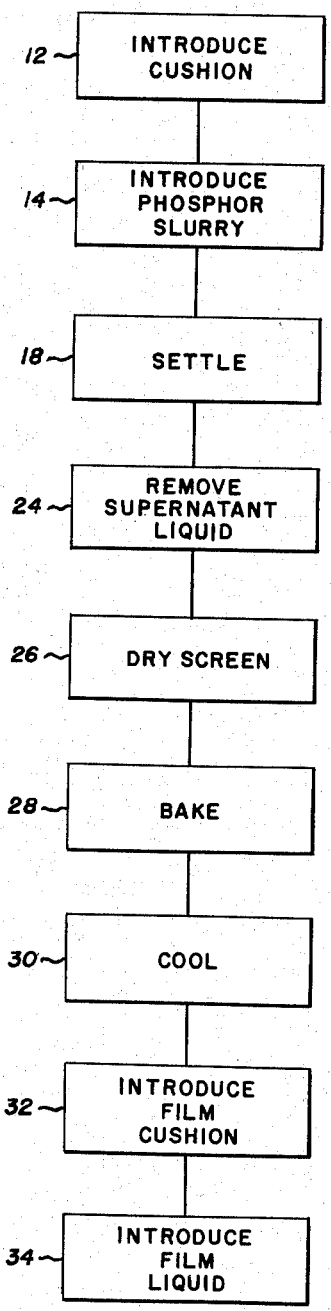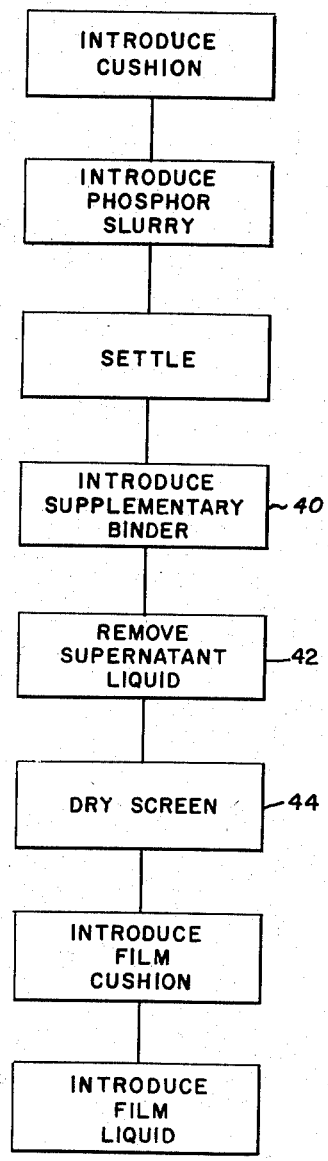

2,907,673

METHOD FOR INCREASING DRY ADHESION OF LUMINESCENT SCREENS

Harold F. Windsor, Syracuse, N.Y., assignor to General Electric Company, a corporation of New York Application September 16, 1957, Serial No. 683,995

7 Claims. (Cl. 117—33.5)

This invention relates to the making of luminescent screens for cathode ray tubes and the like. More particularly the invention relates to improvements in the liquid-settling type of screen making process.

In making screens according to one known liquid settling process, the interior surface of the faceplate of the cathode ray tube envelope or other substrate upon which the screen is to be formed is covered with a cushioning liquid through which the phosphor screen material, together with a suitable binder, is allowed to settle onto the surface of the substrate. After sufficient phosphor has settled to form a screen of the desired thickness, the supernatant liquid is decanted or siphoned off and the screen is dried. Thereafter if the screen is to be covered with a reflective metal coating such as aluminum, the screen is recovered with a water cushion, a suitable film-forming resin dissolved in a volatile solvent is spread on top of the water cushion, and after a resin film has formed the excess liquid is removed. The film and screen are then dried and the metal coating is applied, as by evaporation onto the film. Subsequent heat treatment evaporates off the resin film, leaving the metal coating in place on the screen.

Alternatively the filming operation may be combined with the screening process, in which case the phosphor layer may be applied as above-described, but after the phosphor has settled only a portion of the supernatant liquid is removed, leaving a residual portion of liquid onto which the film forming resin is cast. After the resin film forms, the excess solution is removed, and after drying, the metal layer is applied as previously described.

A factor of particular importance in successfully making screens according to the above-described methods is the dry adhesion of the phosphor layer, i.e. the tenacity with which the individual particles of phosphor cling to one another and to the substrate after the phosphor is dried in place. The importance of the dry adhesion of the phosphor layer will be appreciated when it is recognized that the successful fabrication of a complete screen depends on the preservation of the phosphor layer in place and intact without scaling or flaking, or formation of tears, gaps, or "avalanches," during all the processing steps subsequent to the application of the phosphor layer. The preservation of the phosphor layer intact during the subsequent steps of filming, metalizing, and bakeout is largely dependent on the dry adhesion of the phosphor layer.

Various adhesion-enhancing techniques have been tried in the past but so far as I am aware none has proved entirely satisfactory for various reasons. In one prior art approach to the problem, an excessive quantity of binder is used in the binder-phosphor slurry, but this is expensive because of the substantial quantity of additional material required, and moreover causes undesirable clumping or agglomerating of the phosphor screen particles during settling, thereby undesirably coarsening the settled screen. Also excess binder in the cushioning liquid is likely to stick to the envelope wall in undesired places during pouring off, a result which is undesirable from an electrical insulation standpoint. Another approach involves pouring additional binder onto the settled screen after the cushioning liquid is removed but this is not satisfactory because of the danger of damaging the screen by the impact of the additional binder, the likelihood of discoloring the screen, and the additional time required for this extra step.

Accordingly, it is a principal object of the present invention to provide an improved method of making luminescent screens for cathode ray tubes and the like wherein enhanced dry adhesion is provided between the individual particles of luminescent material of the screen and between the luminescent material and the substrate on which it is formed.

Another object is to provide an improved method of increasing the dry adhesion of a liquid settled screen for cathode ray tubes and the like which adds nothing to the time heretofore required for screening, and which is free from any possibility of damage to the phosphor layer.

Another object is to provide an improved method for increasing the dry screen adhesion of a liquid settled phosphor for cathode ray tubes and the like which is simple, easy to perform, and cheap.

Another object is to provide an improved method of liquid settling for cathode ray tubes and the like which facilitates production of a screen having desirably small phosphor particle size and which eliminates the need for baking of the settled phosphor layer before filming.

These and other objects of the invention will be apparent in the light of the following description, and the scope of the invention will be defined in the appended claims.

Briefly the present invention is based on the discovery that the tenacity with which the phosphor particles of the settled and dried phosphor layer adhere to each other and to the substrate can be substantially increased by adding to the supernatant cushioning liquid, after the desired amount of phosphor has settled and shortly before removal of cushioning liquid, a slight amount of supplementary concentrated binder material. The supplementary binder preferably takes the form of a liquid having a density sufficiently greater than the cushioning liquid as to settle rapidly through the cushioning liquid onto the previously settled phosphor layer, and capable of penetrating the pores of the previously settled phosphor layer. The exact manner in which the slight amount of supplementary binder produces such a marked increase in dry screen adhesion is not fully understood, but is believed to result from the formation of a substantially increased number of bonds between the settled phosphor particles and particles of binder already present. Materials which I have found particularly suitable for use as supplementary binders according to the present invention are concentrated solutions of soluble silicates, such as potassium or ethyl silicate, of sufficient concentration as to have a substantially greater density than the cushioning solution.

In the drawing,

Figures 3a and 3b are flow charts respectively showing a conventional prior art liquid-settling screening process, and a modified liquid-settling process according to the present invention.

Figure 1:
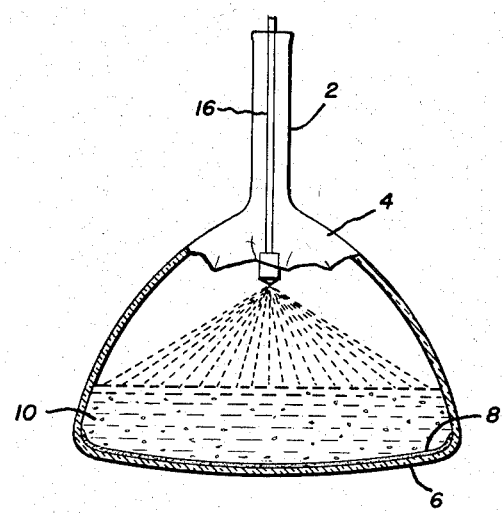
Figure 1 is a view, partly broken away in vertical section, of a cathode ray tube envelope arranged to receive a luminescent screen by a liquid-settling process according to the present invention.

Referring to Figure 1, there is shown an exemplary cathode ray tube envelope including a neck 2, a cone 4 and a faceplate 6. The faceplate 6 may be flat or curved and provides a substrate on the interior surface 8 of which a luminescent screen is to be formed.

In carrying out one type of liquid settling process, there is dispensed into the tube envelope a charge of cushioning liquid 10, as shown at 12 in Figure 3a, which may be a neutral liquid such as water but preferably is an electrolytic solution such as a water solution of an alkaline earth metal salt, for example barium acetate. Into the cushioning liquid 10 is dispensed, as shown at 14 in Figure 3a, a suspension or a slurry of powdered phosphor in a suitable liquid binder such as a water solution of sodium or potassium silicate. The slurry may be poured directly into the cushioning liquid 10 and the resulting mixture well agitated to give even distribution of the phosphor particles throughout the mixture, after which settling is allowed to take place, as shown at 18 in Figure 3a. Alternatively the slurry may be evenly distributed on top of the cushioning liquid, as by spraying thereon from a nozzle 16 disposed above the cushioning liquid, and thence settled onto the substrate 6.

Still other alternative settling procedures may be employed within the contemplation of the present invention, such as for example placing the binder in the cushioning solution separate from the phosphor and subsequently dispensing the phosphor into or onto the cushioning solution. In any event the same ingredients are present, namely phosphor, binder, and cushioning liquid, and the phosphor is settled through the cushioning liquid together with the binder and becomes deposited on the surface of the substrate in a layer of the desired thickness with the phosphor particles secured to each other and to the substrate by the binder.

Figure 2:
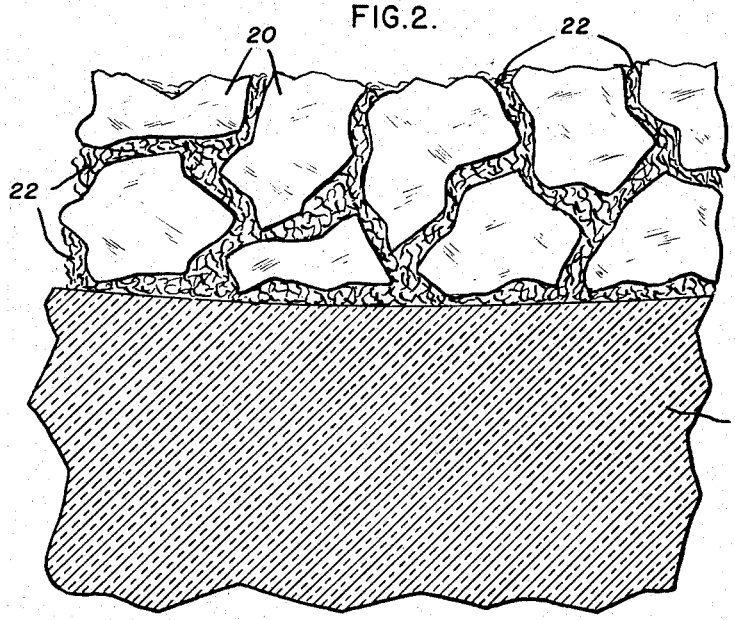
Figure 2 is an enlarged cross-sectional view of a fragment of the faceplate of the envelope of Figure 1, at an intermediate stage in the screening process.

The completion of the above-described phase of the settling process is illustrated in Figure 2, which shows the substrate 6, with phosphor particles 20 settled thereon and the binder in the form of gelatinous strands 22 tying the phosphor particles 20 together and securing them to the substrate 6.

After the supernatant liquid is removed, as by decanting or siphoning as shown at 24 in Figure 3a, the deposited phosphor and binder is dried, for example by currents of warm air as shown at 26 in Figure 3a. If the phosphor layer is to be metalized the screen is covered with a resin film, as by flotation or spraying. Before filming, it is often necessary, particularly when the phosphor layer is relatively thick, to bake for a substantial period at an elevated temperature, as shown at 28 in Figure 3a. The purpose of this baking step is to help the phosphor layer to withstand the loosening action of the filming step, which may be due to the direct impact of the filming solution if it is applied by spraying, or to the application of the film cushion or the contraction of the film upon drying if the film is applied by flotation. Such baking may take, for example, one hour at 400° C. After allowing sufficient time for the envelope to cool to a safe temperature, as shown at 30 in Figure 3a, the screen is filmed. If flotation filming is employed, for example, the screen is covered with a suitable filming cushion such as deionized water, step 32 in Figure 3a, after which a suitable heat-removable film forming resin dissolved in a volatile solvent, such as nitrocellulose dissolved in amyl acetate, is spread on the surface of the water cushion, as at 34 in Figure 3a. After a resin film of the desired thickness has been formed by evaporation, the supernatant liquid is removed by decanting or siphoning and the film and phosphor layer are dried, for example by currents of warm air. The screen is then ready for application of the metal film by evaporation or otherwise. Subsequently the screen is again baked at a sufficient temperature and for a sufficient time to evaporate and drive off the resin film, for example at 400° C. for one hour, leaving the metal layer in place on the phosphor.

In practice it has been found that during the several conventional processing steps subsequent to the phosphor settling step the phosphor layer must be handled with considerable delicacy in order to preserve it intact and prevent formation of holes, tears, or other defects which would render the completed screen unacceptable. This considerably prolongs the screening process. For example, considerable time, of the order of thirty minutes to two hours, must be allowed for the binder to set up sufficiently to hold the phosphor in place during decantation of the cushioning liquid. And with relatively thin screens, even this length of time is not sufficient to insure against formation of defects during pour-off. Moreover the pre-film baking and subsequent cooling, as shown at 28 and 30 in Figure 3a, adds considerably to the required duration of the screening process. In addition to the possibility of its injury if it is not handled particularly delicately, the phosphor layer may be injured by the bake-out employed to evaporate the film from beneath the deposited metal layer. During this step the escape of the gases trapped between the phosphor and metal layer has a tendency to rupture the phosphor. Accordingly, an increased dry adhesion of the phosphor is very important in minimizing the possibility of damage to the screen, while at the same time simplifying screening and making possible the elimination of some of the above-described process steps.

In accordance with the present invention, I have found that the dry adhesion of the phosphor layer can be strikingly increased by the addition to the cushioning liquid, after the phosphor has settled and shortly before the removal of the cushioning liquid, of a slight quantity of supplementary binder in concentrated liquid form, and of a density such as to sink rapidly through the cushioning liquid. I have obtained excellent results, for example, by adding a slight quantity of commercial full strength aqueous solution of potassium silicate, containing approximately 28% by weight of silicate. The full strength silicate, having a density of 1.4 times that of water, is considerably heavier than the largely aqueous cushioning liquid and is allowed to settle rapidly through the cushioning liquid onto the deposited phosphor, as shown at step 40 in Figure 3b. The supplementary binder is dispersed through the cushioning liquid as it settles onto the phosphor and is thus evenly distributed over the phosphor. The cushioning liquid may then be removed as shown at 42 in Fig. 3b, and after drying as shown at 44, the screen is ready for filming.

I have found that to produce a striking increase in dry screen adhesion only a very small amount of such additive is required, approximately 0.5 cc. of 28 weight percent concentration aqueous potassium silicate solution for example being sufficient for the screen of a cathode ray tube having a fourteen-inch diagonal faceplate dimension. Other concentrations and other soluble silicates, such as sodium or ethyl silicate, may be employed, but in general the concentration should preferably be sufficient to give a density substantially greater than that of the cushioning liquid to promote rapid settling of the supplementary binder. The exact manner in which the small amount of supplementary binder so significantly increases the dry screen adhesion is not fully understood but is is believed that this additive settles into the pores of the already deposited phosphor and binder in a form substantially undiluted by contact with the cushioning liquid and hence relatively quite concentrated, and by coalescing and amalgamating with the already deposited phosphor and binder produces upon dehydration a greatly increased molecular cross-linking of the settled material. It any rate, I have found that once the screen is dried after the addition of the supplementary binder, the bond of portions of the phosphor layer to one another and to the substrate is greatly increased over that heretofore obtainable, and the increase in strength is out of all proportion to the minute quantity of supplementary binder employed.

The following is a detailed example of a screen settling process according to the present invention. Into a cathode ray tube envelope of fourteen-inch faceplate diagonal size, disposed as shown in Figure 1 with its neck vertical, I dispense a charge of electrolytic cushioning liquid consisting of approximately 3500 cc. of water and 400 cc. of a water solution of barium acetate having a barium acetate concentration of 0.6% by weight. Into the cushioning solution I spray, as from nozzle 12, a binder-phosphor slurry consisting of 2.7 grams of G.E. No. M30 whitebody silver activated zinc sulfide-zinc cadmium sulfide P4 phosphor mixed with 200 cc. of water and 350 cc. of a potassium silicate aqueous solution containing 14% by weight of potassium silicate. After allowing a settling time of from 1 to 1.5 hours at a temperature of 22° C., I dispense onto the surface of the cushioning liquid 7 to 10 drops, i.e. 0.35 to 0.5 cc., of 28% strength by weight aqueous solution of potassium silicate (Philadelphia Quartz Co. Kasil No. 1). One minute after introduction of the drops of silicate, the supernatant liquid is decanted and the screen dried with currents of air warmed to 100° C.

The significant increase in dry adhesive strength of the screen obtained in accordance with the present invention is well-illustrated in the following table, which shows results obtained in screening with P4 type phosphor:

*Dry screen adhesion (as measured by loosening air pressure in lbs./sq. in.)*

| Volume of 28% Silicate in Two Liters of Screening Solution, cc. | Prefilm | | Rewet | | Bakeout | |
|---|---|---|---|---|---|---|
| | A | B | A | B | A | B |
| 8.6 | 17 | 2 | 14 | 1 | 13 | 1 |
| 10.4 | 19 | 2 | 12 | 1 | 11 | 1 |
| 11.6 | 33 | 2 | 15 | 1 | 17 | 1 |
| 14.5 | 44 | 2 | 18 | 1 | 22 | 1 |
| 17.3 | 11 | 5 | 11 | 2 | 8 | 2 |
| 20.2 | 48 | 13 | 51 | 2 | 17 | 3 |
| 26.0 | 80 | 15 | 43 | 3 | 43 | 9 |
| 28.9 | 77 | 24 | 45 | 23 | 47 | 25 |
| 31.8 | 90 | 19 | 87 | 13 | 87 | 23 |

This table lists the dry adhesion of the screen amounts of 28 weight percent strength aqueous solution of potassium silicate in the cushioning liquid. The dry adhesion of the screen is measured in terms of the pressure of air required to blow a hole in the screen, the air being directed at an angle of 45° from a precision orifice placed at a predetermined distance from the screen. The pre-film adhesion is that achieved after carrying out steps corresponding to those described in the above example. The rewet dry adhesion is that achieved after the dried screen is soaked in water for one minute, drained and redried with warm air. The bakeout adhesion is that achieved after the screen is baked at 400° C. for approximately one hour. In the columns of the table marked "A" are listed strengths of screens made as above-described using the supplementary binder according to the present invention, while in the columns marked "B" are listed strength of screens made identically except that no supplementary binder was used.

As will be apparent from the table, with a silicate binder strength of 0.25% by weight in the phosphor-binder slurry (14.5 cc. 28% silicate in 2 liters of screening solution), the adhesive strength of the screen without the additive is 2 lbs. per square inch whereas with the additive it is 44 lbs. per square inch, an increase in strength by a factor of 22. For the same screen the rewet dry adhesive strength was increased by a factor of 18, and the bakeout adhesive strength was increased by a factor of 22.

Also as will be apparent from the table, the present invention enables a substantial reduction in the quantity of silicate required to obtain a given dry adhesion. For example it may be observed that only 10.5 cc. of 28% potassium silicate aqueous solution was required in the screening solution to achieve a pre-film dry adhesion of 19 p.s.i. as shown in column "A" when the supplementary binder was used, whereas 31.8 cc. of silicate was required to achieve the same strength by the prior art method as shown in column "B." This represents a saving in silicate of 3 to 1.

The improved screening process of the present invention not only produces a striking increase in dry adhesive strength of the screen, but from this increased dry adhesion a number of subsidiary advantages flow. First, as shown from the above table, the present invention enables a reduction in the amount of binder required in the cushioning liquid at the time the phosphor is settling, the reduction in dry adhesion which would otherwise occur from so reducing the binder being more than made up by the action of the supplementary binder supplied just before pour-off. Also the addition of the supplementary binder according to the present invention eliminates the need of the time-consuming baking and consequent cooling of the screen before filming, as heretofore required in order to strengthen the screen sufficiently to withstand the loosening effect of the filming operation. The present invention therefore makes possible a significant reduction in material cost as well as processing time for making screens. Moreover the reduction possible in the amount of binder present in the cushioning liquid while the phosphor is settling permits a corresponding reduction in the strength of the electrolyte, which correspondingly reduces the tendency of phosphor particles to agglomerate while settling. This produces a desirably fine grained screen of minimum phosphor particle size and capable of taking a metal coating of increased smoothness, which in turn results in an increased light output.

Thus it will be seen that the improvement in liquid settling of phosphor screens according to the present invention is simple, easy to perform, economical of processing time and processing reagents, free of danger of injury to the screen and productive of a dry adhesion significantly increased in comparison to that obtained by prior art methods.

It will be appreciated by those skilled in the art that the invention may be carried out in various ways and may take various forms and embodiments other than those illustrative embodiments heretofore described. It is to be understood that the scope of the invention is not limited by the details of the foregoing description, but will be defined in the following claims.

What I claim as new and desire to secure by Letters Patent of the United States is:

1. In a process of making a luminescent phosphor screen for a cathode ray tube or the like which includes the steps of covering a substrate with a layer of cushioning liquid consisting essentially of an aqueous solution of an ionizable salt and containing particles of luminescent material and from .05 to .80 weight percent of a precipitable binder for securing said particles together, allowing the luminescent material and binder to settle through the cushioning liquid onto the substrate in a layer of desired thickness, removing the cushioning liquid, and drying the layer of settled material in place on the substrate, the method of increasing the dry adhesion of the luminescent material particles to each other and to the substrate which comprises dispensing into the cushioning liquid, near the end of the settling period and just before removal of the cushioning liquid, a supplementary binder in the form of a concentrated solution of soluble silicate having a density greater than said cushioning liquid, the amount of said supplementary binder being less than 10% of the binder mixed with said cushioning liquid during settling of said luminescent material and allowing the supplementary binder to settle through the cushioning liquid onto the layer of settled luminescent material.

2. In a process of making a luminescent screen for a cathode ray tube or the like which includes the steps of covering a substrate with a layer of cushioning liquid consisting essentially of an aqueous solution of an ionizable salt and containing particles of luminescent material and from a .05 to .80 weight percent of a precipitable binder for securing said particles together, allowing the luminescent material and binder to settle through the cushioning liquid onto the substrate in a layer of desired thickness, removing the cushioning liquid, and drying the layer of settled material in place on the substrate, the method of increasing the dry adhesion of the luminescent material particles to each other and to the substrate which comprises dispensing into the cushioning liquid, near the end of the settling period and just before removal of the cushioning liquid, a supplementary binder in the form of a solution of alkaline earth metal silicate having a density greater than said cushioning liquid, the amount of said supplementary binder being less than 10% of the binder mixed with said cushioning liquid during settling of said luminescent material and allowing the supplementary binder to settle through the cushioning liquid onto the layer of settled luminescent material.

3. In a process of making a luminescent screen for a cathode ray tube or the like which includes the steps of covering a substrate with a layer of cushioning liquid consisting essentially of an aqueous solution of an ionizable salt and containing particles of luminescent material and from .05 to .80 weight percent of a precipitable binder for securing said particles together, allowing the luminescent material and binder to settle through the cushioning liquid onto the substrate in a layer of desired thickness, removing the cushioning liquid, and drying the layer of settled material in place on the substrate, the method of increasing the dry adhesion of the luminescent material particles to each other and to the substrate which comprises dispensing into the cushioning liquid, near the end of the settling period and just before removal of the cushioning liquid, a supplementary binder in the form of a solution of potassium silicate having a density greater than said cushioning liquid, the amount of said supplementary binder being less than 10% of the binder mixed with said cushioning liquid during settling of said luminescent material and allowing the supplementary binder to settle through the cushioning liquid onto the layer of settled luminescent material.

4. In a process of making a luminescent screen for a cathode ray tube or the like which includes the steps of covering a substrate with a layer of cushioning liquid consisting essentially of an aqueous solution of an ionizable salt and containing particles of luminescent material and from .05 to .80 weight percent of a precipitable binder for securing said particles together, allowing the luminescent material and binder to settle through the cushioning liquid onto the substrate in a layer of desired thickness, removing the cushioning liquid, and drying the layer of settled material in place on the substrate, the method of increasing the dry adhesion of the luminescent material particles to each other and to the substrate which comprises dispensing into the cushioning liquid, near the end of the settling period and just before removal of the cushioning liquid, a quantity of supplementary binder in the form of a concentrated aqueous solution of alkaline earth metal silicate having a specific gravity substantially greater than said cushioning liquid, said quantity being of the order of .01 cc. per square inch of luminescent material-covered substrate, and allowing the supplementary binder to settle through the cushioning liquid onto the layer of settled luminescent material.

5. In a process of making a phosphor screen for a cathode ray tube or the like which includes the steps of covering a substrate with a layer of cushioning liquid consisting essentially of an aqueous solution of an ionizable salt and containing particles of phosphor and from .05 to .80 weight percent of a precipitable binder for securing said particles together, allowing the phosphor and binder to settle through the cushioning liquid onto the substrate in a layer of desired thickness, removing the cushioning liquid, and drying the layer of phosphor in place on the substrate, the improvement which comprises dispensing into the cushioning liquid, near the end of the settling period and just before removal of the cushioning liquid, a small quantity of supplementary binder in the form of a substantially saturated aqueous solution of potassium silicate, said quantity being approximately .003 to .010 cc. per square inch of phosphor-covered substrate, and allowing the supplementary binder to settle through the cushioning liquid onto the layer of settled phosphor.

6. The method of making a phosphor screen for a cathode ray tube or the like comprising the steps of covering a substrate with a layer of cushioning liquid consisting essentially of an aqueous solution of an ionizable salt and containing particles of phosphor and from .05 to .80 weight percent of a precipitable binder for securing said particles together, allowing the phosphor and binder to settle through the cushioning liquid onto the substrate to form a layer of desired thickness, dispensing into the cushioning liquid near the end of the settling period a quantity of supplementary binder in the form of a solution of soluble silicate having a density greater than that of said cushioning liquid, the amount of said supplementary binder being less than 10% of the binder mixed with said cushioning liquid during settling of said luminescent material allowing the supplementary binder to settle through the cushioning liquid onto the layer of settled phosphor, removing the cushioning liquid, and drying the layer of phosphor in place on the substrate.

7. The method of making a phosphor screen for a cathode ray tube or the like comprising the steps of covering a substrate with a layer of cushioning liquid consisting essentially of an aqueous solution of an ionizable salt and containing particles of phosphor and from .05 to .80 weight percent of a precipitable binder for securing said particles together, allowing the phosphor and binder to settle through the cushioning liquid onto the substrate in a layer of desired thickness, dispensing into the cushioning liquid near the end of the settling period a quantity of supplementary binder in the form of a concentrated aqueous solution of potassium silicate having a specific gravity substantially greater than said cushioning liquid, said quantity being approximately .003 to .010 cc. and containing .0008 to .0028 gram of potassium silicate per square inch of phosphor-covered substrate, allowing the supplementary binder to settle through the cushioning liquid onto the layer of settled phosphor, removing the cushioning liquid, and drying the layer of phosphor in place on the substrate.

References Cited in the file of this patent

UNITED STATES PATENTS 2,793,137    Friedman    May 21, 1957

FOREIGN PATENTS 749,747    Great Britain    May 30, 1956